United States Patent
Oh

(10) Patent No.: US 9,625,729 B2
(45) Date of Patent: Apr. 18, 2017

(54) LIQUID CRYSTAL LENS AND DISPLAY DEVICE INCLUDING LIQUID CRYSTAL LENS

(71) Applicant: Samsung Display Co., Ltd., Yongin (KR)

(72) Inventor: Soo Hee Oh, Gunpo-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 81 days.

(21) Appl. No.: 14/480,934

(22) Filed: Sep. 9, 2014

(65) Prior Publication Data

US 2015/0160464 A1    Jun. 11, 2015

(30) Foreign Application Priority Data

Dec. 11, 2013 (KR) .......................... 10-2013-0153831

(51) Int. Cl.
  *G02F 1/1335* (2006.01)
  *G02B 27/22* (2006.01)
  *G02F 1/29* (2006.01)

(52) U.S. Cl.
  CPC .......... *G02B 27/2214* (2013.01); *G02F 1/29* (2013.01); *G02F 2001/294* (2013.01)

(58) Field of Classification Search
  CPC .. G02B 27/2214; G02F 1/29; G02F 2001/294
  USPC ...................................................... 349/13–15
  See application file for complete search history.

(56) References Cited

U.S. PATENT DOCUMENTS

| 8,149,348 B2 | 4/2012 | Yun et al. |
| 2009/0262420 A1 | 10/2009 | Yun et al. |
| 2011/0157499 A1 | 6/2011 | Lee et al. |
| 2011/0164318 A1 | 7/2011 | Yun et al. |
| 2011/0228181 A1 | 9/2011 | Jeong et al. |
| 2012/0314144 A1* | 12/2012 | Sugita ................ H04N 13/0404 349/15 |
| 2014/0347614 A1* | 11/2014 | Asada ................... G02F 1/1337 349/123 |

FOREIGN PATENT DOCUMENTS

| JP | 4383005 | 10/2009 |
| JP | 2012173715 | 9/2012 |
| JP | 2012252293 | 12/2012 |
| KR | 1020110045700 | 5/2011 |
| KR | 1020110104701 | 9/2011 |
| KR | 101274717 | 6/2013 |

* cited by examiner

*Primary Examiner* — Charles Chang
(74) *Attorney, Agent, or Firm* — Cantor Colburn LLP

(57) ABSTRACT

A liquid crystal lens includes a lower substrate, an upper substrate disposed opposite to the lower substrate, a plurality of lower lens electrodes disposed on the lower substrate and corresponding to a unit liquid crystal lens, an upper lens electrode disposed on substantially an entire surface of the upper substrate, a spacer disposed between the lower substrate and the upper substrate, and a liquid crystal layer disposed between the lower substrate and the upper substrate, where the lower lens electrodes includes a flat-shaped central lens electrode disposed at a central portion thereof and has a width wider than a width of other lower lens electrodes corresponding to the unit liquid crystal lens, and the spacer is disposed only on the central lens electrode.

20 Claims, 15 Drawing Sheets

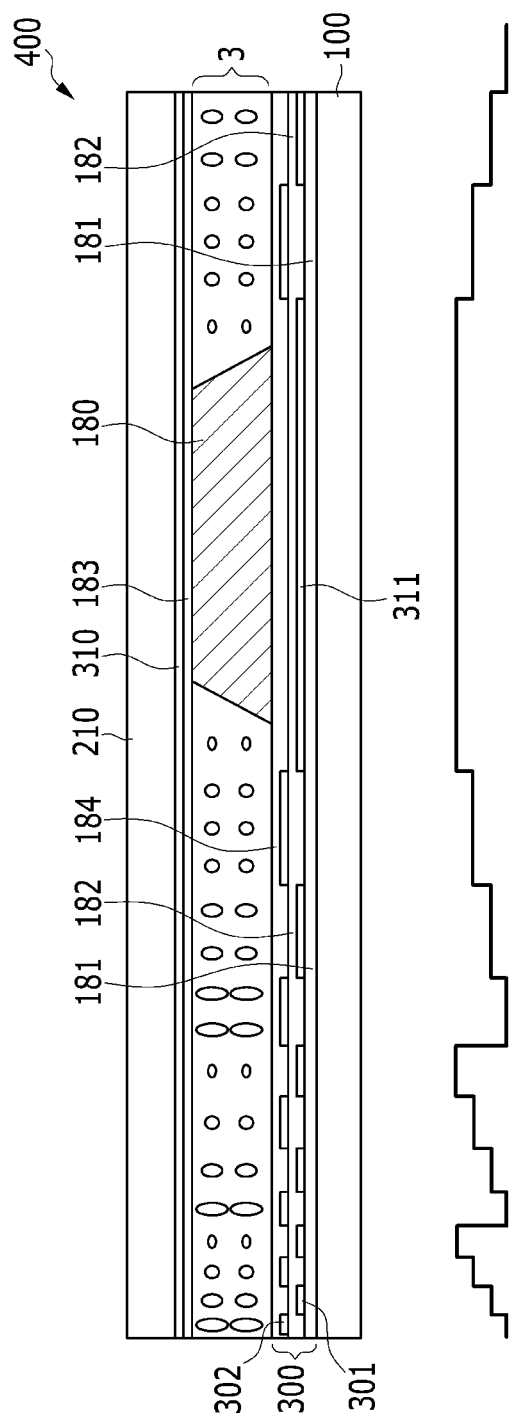

(A)

(B)

(C)

LIQUID CRYSTAL LENS AND DISPLAY DEVICE INCLUDING LIQUID CRYSTAL LENS

This application claims priority to Korean Patent Application No. 10-2013-0153831 filed on Dec. 11, 2013, and all the benefits accruing therefrom under 35 U.S.C. §119, the contents of which in its entirety is herein incorporated by reference.

BACKGROUND (a) Field

Exemplary embodiments of the invention relate to a liquid crystal lens and a display device including the liquid crystal lens.

(b) Description of the Related Art

In recent years, a three-dimensional ("3D") stereoscopic image display device has been developed, and various methods for displaying a 3D image have been studied.

A method that is the most widely used in implementing a stereoscopic image is a method using binocular disparity. In the method using binocular disparity, two images including an image reaching the left eye and an image reaching the right eye are displayed on the same display device, and the two images are allowed to be incident to the left eye and the right eye of an observer, respectively. That is, the images observed at different angles are input to both eyes, such that the observer recognizes the image as a stereoscopic image.

In the method using binocular disparity, a method used to allow the images to be incident to the left eye and the right eye of the observer, respectively, may include a method using a barrier and a method using a lenticular lens such as a cylindrical lens.

In a stereoscopic image display device using the barrier, a slit is provided at the barrier, and the image from the display device is divided into a left eye image and a right eye image through the slit, such that the divided images are incident to the left eye and the right eye of the observer.

In a stereoscopic image display device using the lens, a left eye image and a right eye image are displayed, and the image from the stereoscopic image display device is divided into the left eye image and the right eye image by changing an optical path thereof using the lens.

Recently, a display device for displaying both a two-dimensional image and a 3D image has been developed by switching a mode for displaying a plane image to a mode for displaying a stereoscopic image, and a lens that operates based on the switching the modes has been also developed.

SUMMARY

Exemplary embodiments of the invention provide a liquid crystal lens and a display device including the liquid crystal lens, in which an error such as texture occurring on a surface of a liquid crystal lens is effectively prevented and diffraction efficiency is improved by adjusting a width of a central electrode formed under the liquid crystal lens to form the liquid crystal lens to have a flat phase at a central portion thereof and disposing a column spacer only on the central electrode of the liquid crystal lens.

An exemplary embodiment of the invention provides a liquid crystal lens including: a lower substrate; an upper substrate disposed opposite to the lower substrate; a plurality of lower lens electrodes disposed on the lower substrate and corresponding to a unit liquid crystal lens; an upper lens electrode disposed on substantially an entire surface of the upper substrate; a spacer disposed formed between the lower substrate and the upper substrate; and a liquid crystal layer disposed between the lower substrate and the upper substrate, in which the lower lens electrodes includes a flat-shaped central lens electrode disposed at a central portion of the liquid crystal lens and having a width wider than a width of other lower lens electrodes corresponding to the unit liquid crystal lens, and the spacer is disposed only on the central lens electrode.

In an exemplary embodiment, the liquid crystal lens may further include a first insulating layer disposed on the lower substrate, a first lens electrode layer disposed on the first insulating layer, a second insulating layer disposed on the first lens electrode layer, and a second lens electrode layer disposed on the second insulating layer, where the lower lens electrodes are disposed in the first and second lens electrode layers.

In an exemplary embodiment, the central lens electrode may be disposed in the first lens electrode layer or the second lens electrode layer.

In an exemplary embodiment, a phase of the liquid crystal lens may be flat at the central portion thereof where the central lens electrode is disposed.

In an exemplary embodiment, a value of the phase at the central portion of the liquid crystal lens may be less than values of phases at portions of the liquid crystal lens other than the central portion.

In an exemplary embodiment, a width of the central lens electrode may satisfy the following formula: $p/n \leq L^* \cos\theta \leq p$, where p denotes a cross-sectional pitch of a sub-pixel of a three-dimensional image to be displayed through the liquid crystal lens, n denotes the number of the unit liquid crystal lens constituting a unit pixel of the three-dimensional image, L denotes a width of the central lens electrode, and $\theta$ denotes a slope between the liquid crystal lens and a display panel which display the three dimensional image.

In an exemplary embodiment, the spacer may be a fixed spacer, and a plurality of spacers may be disposed along a line in which the central lens electrode extends.

In an exemplary embodiment, the spacer may be a column spacer.

In an exemplary embodiment, a top surface and a bottom surface of the spacer may have a flat circular shape.

In an exemplary embodiment, the spacers may include a main spacer which supports the upper substrate and the lower substrate, and a sub spacer which allows the upper substrate and the lower substrate to be flexible.

In an exemplary embodiment, an area ratio of the spacers occupying in the liquid crystal lens may be in a range of about 0.1 to about 0.2.

In an exemplary embodiment, a distance between the spacers may satisfy the following formula: $R < |d| \leq AM/M^*Lp$, where R denotes a diameter of each of the spacers, d denotes a distance between two adjacent spacers, AM denotes a maximum area of each of the spacers, M denotes an area ratio of the spacers occupying in the liquid crystal lens, and Lp denotes the shortest distance between central lens electrodes in adjacent unit liquid crystal lenses.

In an exemplary embodiment, a cell gap at the central portion of the liquid crystal lens may be greater than cell gaps at edge portions of the liquid crystal lens.

Another exemplary embodiment of the invention provides a display device including: a display panel which displays an image; and a liquid crystal lens which allows the image on the display panel to be seen as a two-dimensional image or a three-dimensional image, where the liquid crystal lens includes a lower substrate, an upper substrate disposed opposite to the lower substrate, a plurality of lower lens electrodes disposed on the lower substrate and corresponding to a unit liquid crystal lens, an upper lens electrode disposed on substantially an entire surface of the upper substrate, a spacer disposed between the lower substrate and the upper substrate, and a liquid crystal layer disposed between the lower substrate and the upper substrate. In such an embodiment, the lower lens electrodes include a flat-shaped central lens electrode disposed at a central portion of the liquid crystal lens and having a width wider than a width of other lower lens electrodes corresponding to the unit lower lens, and the spacer is disposed only on the central lens electrode.

According to exemplary embodiments of the invention, an error such as texture occurring on a surface of a liquid crystal lens is effectively prevented and diffraction efficiency is substantially improved by adjusting a width of a central electrode provided under the liquid crystal lens to form the liquid crystal lens to have a flat phase at a central portion thereof and disposing a column spacer only on the central electrode of the liquid crystal lens.

BRIEF DESCRIPTION OF THE DRAWINGS

The above and other features of the invention will become more apparent by describing in further detail exemplary embodiments thereof with reference to the accompanying drawings, in which:

FIGS. 2A to 2D are cross-sectional views of alternative exemplary embodiments of the liquid crystal lens, according to the invention;

DETAILED DESCRIPTION

Figure 1:
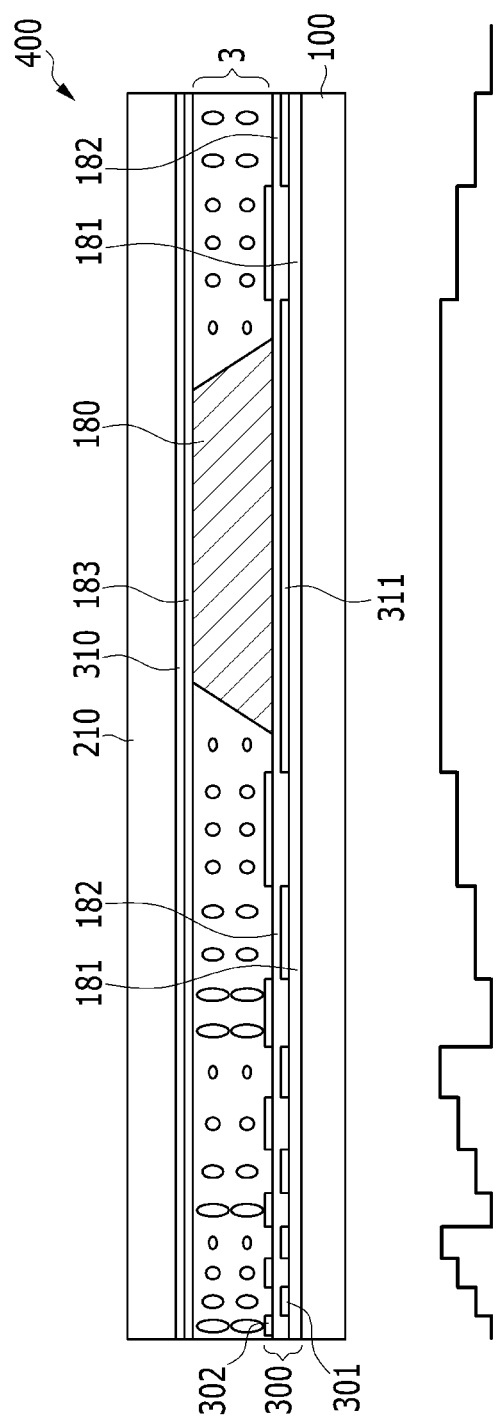
FIG. 1 is cross-sectional view of an exemplary embodiment of a liquid crystal lens according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of a liquid crystal lens and a display device, to which the liquid crystal lens is applied, will be described in detail with reference to the accompanying drawings.

A structure of an exemplary embodiment of a liquid crystal lens according to the invention will be described in detail with reference to FIG. 1.

FIG. 1 is a cross-sectional view of an exemplary embodiment of a liquid crystal lens according to the invention.

As illustrated in FIG. 1, an exemplary embodiment of a liquid crystal lens according to the invention includes a lower substrate 100, a lower lens electrode 300 on the lower substrate 100, an upper substrate 210 disposed to face the lower substrate 100, an upper lens electrode 310 on the upper substrate 210, a liquid crystal layer 3 interposed between the lower substrate 100 and the upper substrate 210, and a spacer 180 for supporting a space between the lower substrate 100 and the upper substrate 210.

In an exemplary embodiment, the liquid crystal lens is divided into a plurality of unit liquid crystal lenses. In such an embodiment, the lower lens electrode 300 includes first lens electrodes 301 and second lens electrodes 302 which are spaced apart from each other. In such an embodiment, the lower lens electrode 300 includes a plurality of unit lower lens electrodes provided to correspond to a unit liquid crystal lens 400.

The first lens electrodes 301 the second lens electrodes 302, and the upper lens electrode 310 receive voltages to generate an electric field therebetween, such that orientation of liquid crystal molecules of the liquid crystal layer 3 disposed between the lower lens electrode 300 and the upper lens electrode 310 are controlled. Voltages applied to the unit lower lens electrodes 300 may be different from each other, and an orientation degree of the liquid crystal molecules may be changed depending to the applied voltages.

Hereinafter, an exemplary embodiment of the liquid crystal lens will be described in detail.

In an exemplary embodiment, a first insulating layer 181 is disposed on the lower substrate 100, and the plurality of first lens electrodes 301, a second insulating layer 182 and the plurality of second lens electrodes 302 are disposed on the first insulating layer 181.

The first lens electrodes 301 and the second lens electrodes 302 constitute or collectively define the plurality of unit lower lens electrodes 300 that corresponds to the unit liquid crystal lens 400.

In an exemplary embodiment, as show in FIG. 1, the second insulating layer 182 is disposed between the first lens electrodes 301 and the second lens electrodes 302. In such an embodiment, the first lens electrodes 301 and the second lens electrodes 302 are disposed in different layers from each other, and are electrically insulated from each other.

In such an embodiment, as illustrated in FIG. 1, the lower lens electrode 300 includes the first lens electrodes 301 and the second lens electrodes 302 disposed in a plurality of layers, respectively, with the second insulating layer 182 interposed therebetween, but not being limited thereto. The first lens electrodes 301 may define a first lens electrode layer, and the second lens electrodes 302 may define a second lens electrode layer. In an alternative exemplary embodiment, the second lens electrodes 302 and the second insulating layer 182 may be omitted.

In an exemplary embodiment, where the second lens electrodes 302 and the second insulating layer 182 are not provided in the lower lens electrode 300 of the liquid crystal lens, the lower lens electrode 300 is configured as a lower lens electrode 300 having a single layer structure, that is, disposed in a single layer.

The first lens electrodes 301 and the second lens electrodes 302 may include or be made of a transparent conductive oxide. The first and second lens electrodes may include an indium tin oxide ("ITO"), an indium zinc oxide ("IZO") or a combination thereof, for example, but not being limited thereto.

The first insulating layer 181 and the second insulating layer 182 may include an insulating material that transmits light or have high light transparency, e.g., a transparent insulating material. The first and second insulating layers may include or be made of a silicon nitride (SiNx), a silicon oxide (SiOx) or a combination thereof, for example, but not being limited thereto.

The first insulating layer 181 is disposed on the lower substrate 100, and the first lens electrodes 301 are disposed on the first insulating layer 181. The second insulating layer 182 is disposed on the first insulating layer 181 covering the first lens electrodes 301 disposed on the first insulating layer 181, and the second lens electrodes 302 are disposed on the second insulating layer 182.

In an exemplary embodiment, the first lens electrodes 301 includes a central lens electrode having a width wider than a width of other first lens electrodes 301 disposed on the lower substrate 100. The spacer 180 of the liquid crystal lens is disposed on the central lens electrode 311. The spacer 180 may be a column spacer as a fixed spacer.

The central lens electrode 311 and the spacer 180 will be described later in greater detail.

In an exemplary embodiment, as shown in FIG. 1, the upper lens electrode 310 is disposed on the upper substrate 210. The third insulating layer 183 is disposed on the upper lens electrode 310.

The upper lens electrode 310 may include or be made of a transparent conductive oxide. The upper lens electrode may include or be made of an ITO, an IZO or a combination thereof, for example, but not being limited thereto.

The upper lens electrode 310 rearranges the liquid crystal molecules of the liquid crystal layer 3 by cooperating with the first lens electrodes 301 and the second lens electrodes 302 that are arranged on the lower substrate 100.

Accordingly, the first lens electrodes 301, the second lens electrodes 302, the upper lens electrode 310 and the liquid crystal layer 3 constitute a unit lens.

In an exemplary embodiment, the liquid crystal layer 3 may have a thickness of about 5 micrometers (μm) or less.

In such an embodiment, the liquid crystal layer 3 has a thin thickness, speed of switching the orientations of the liquid crystal molecules therein is increased, and the orientations of the liquid crystal molecules by the first lens electrodes 301, the second lens electrodes 302 and the upper lens electrode 310 are effectively controlled to have a refractive index of a Fresnel lens.

In such an embodiment, when a driving voltage is applied to the liquid crystal lens, an electric field is generated between the first and second lens electrodes 301 and 302 and the upper lens electrode 310, such that the liquid crystal molecules of the liquid crystal layer 3 interposed between the first and second lens electrodes 301 and 302 and the upper lens electrode 310 are rearranged. Accordingly, the unit lens may have a predetermined phase shift corresponding to a phase shift of a Fresnel lens, as shown in a phase diagram of FIG. 1 under the cross-sectional view.

Next, structures of various exemplary embodiments of the liquid crystal lenses, according to the invention, will be described in detail with reference to FIGS. 2A to 2D.

FIGS. 2A to 2D are cross-sectional views of alternative exemplary embodiments of the liquid crystal lenses, according to the invention.

Liquid crystal lenses illustrated in FIGS. 2A to 2D have the substantially same configuration as the liquid crystal lens illustrated in FIG. 1, except for a structure of the lower lens electrode 300. The same or like elements shown in FIGS. 2A to 2D have been labeled with the same reference characters as used above to describe the exemplary embodiments of the liquid crystal lenses shown in FIG. 1, and any repetitive detailed description thereof will hereinafter be omitted or simplified.

Figure 2A:
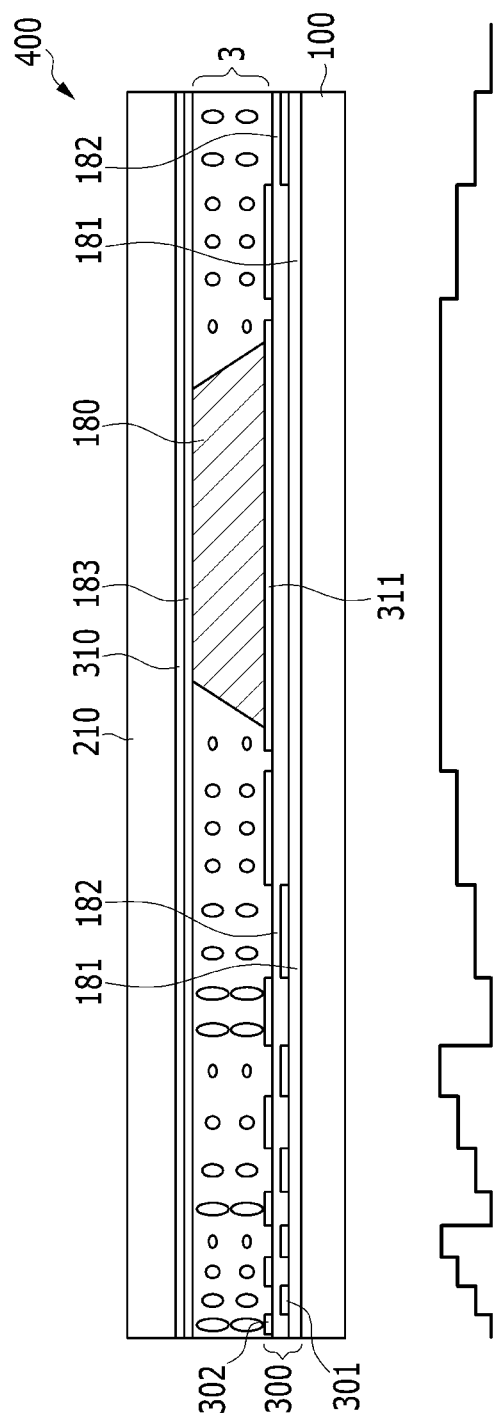

In an exemplary embodiment, as illustrated in FIG. 2A, the lower lens electrode 300 of the liquid crystal lens may have a structure in which the central lens electrode 311 is disposed in a same layer as the second lens electrodes 302. In such an embodiment, the central lens electrode 311 may be disposed on the second insulating layer 182.

Figure 2B:
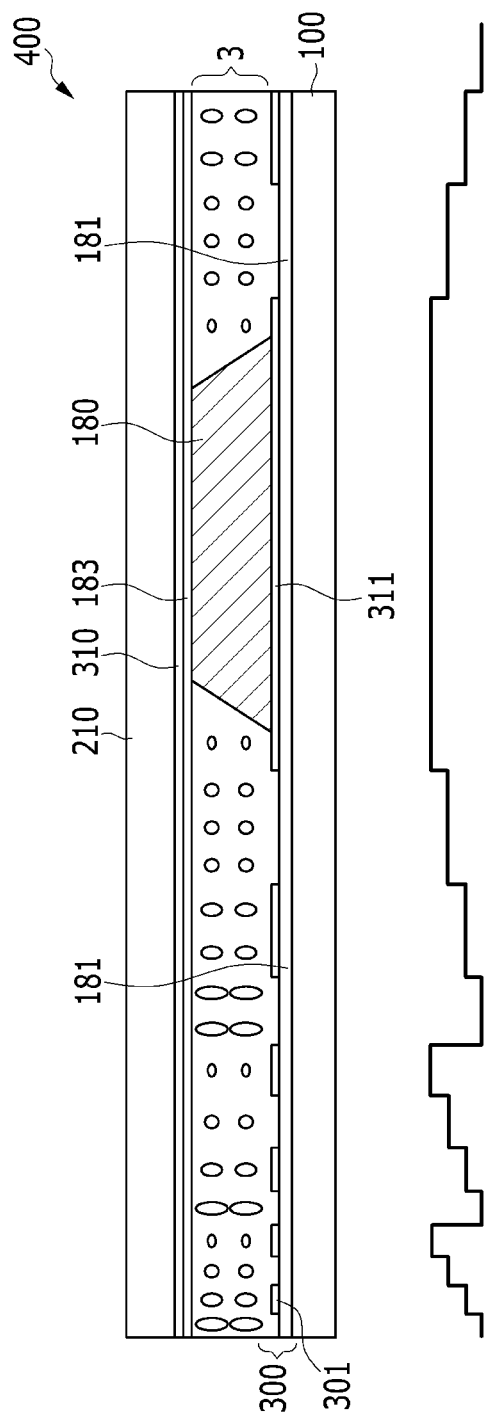

In an alternative exemplary embodiment, as shown in FIG. 2B, the lower lens electrode 300 of the liquid crystal lens may have a single layer structure, in which the second insulating layer 182 and the second lens electrodes 302 are not provided.

In another alternative exemplary embodiment, as shown in FIG. 2C, the liquid crystal lens may have a structure in which a fourth insulating layer 184 disposed on the second lens electrode 302 is further included.

Figure 2D:
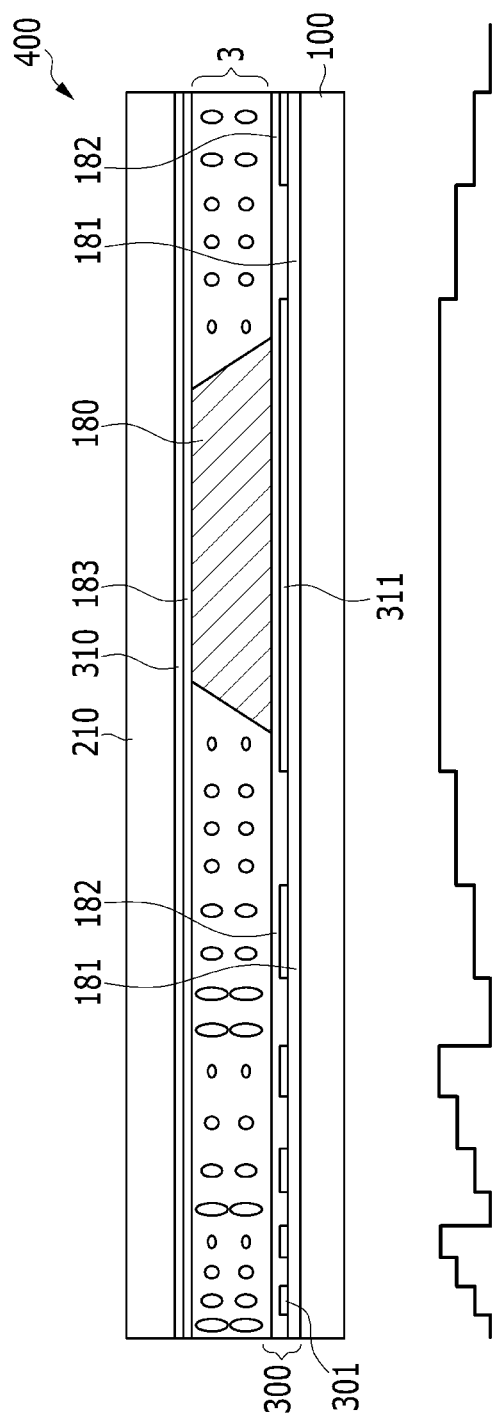

In another alternative exemplary embodiment, as shown in FIG. 2D, the lower lens electrode 300 of the liquid crystal may have a single layer structure in which the second insulating layer 182 is included and only the second lens electrodes 302 are not provided.

As illustrated in FIGS. 2A to 2D, in an exemplary embodiment, the structure of the lower lens electrode 300 of the liquid crystal lens may have various structures such as a single-layer structure or a multi-layer structure.

Next, a phase of an exemplary embodiment of the liquid crystal lens according to the invention will be described in detail with reference to FIGS. 3 and 4.

Figure 3:
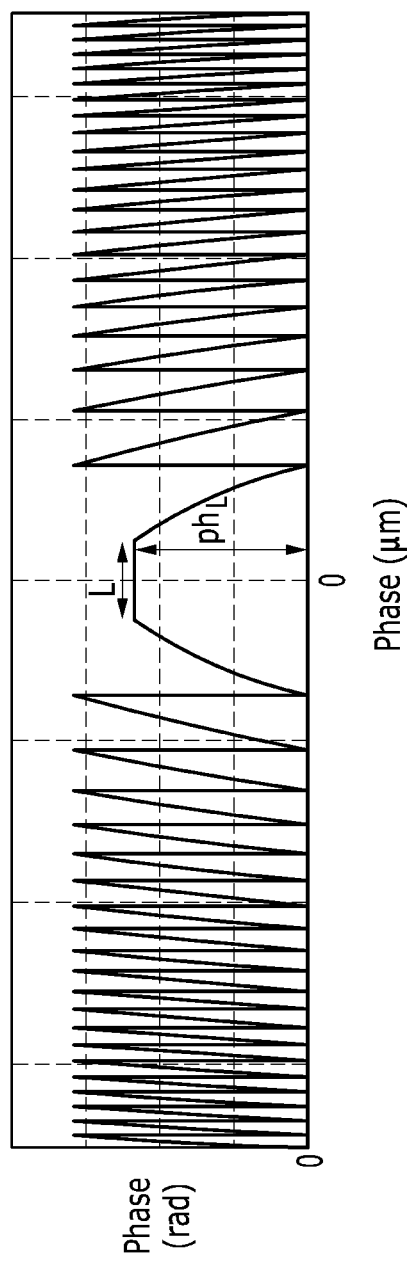
FIG. 3 is a diagram illustrating a phase distribution in an exemplary embodiment of the liquid crystal lens according to the invention.
Figure 4:
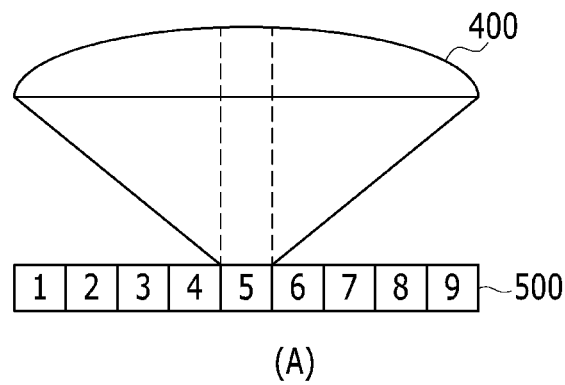
FIG. 4 is a diagram for describing a principle of a lower lens electrode of an exemplary embodiment of the liquid crystal lens according to the invention.
Figure 4:
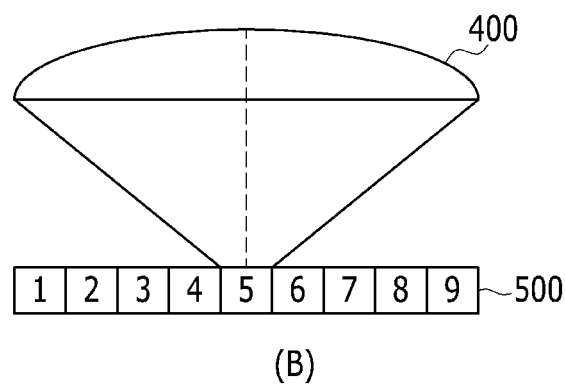
Figure 4:
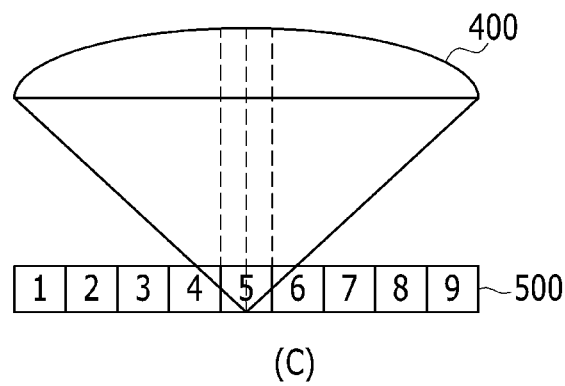

FIG. 3 is a diagram illustrating a phase distribution in an exemplary embodiment of the liquid crystal lens according to the invention, and FIG. 4 is a diagram for describing a principle of the lower lens electrode of an exemplary embodiment of the liquid crystal lens according to the invention.

First, referring to FIG. 3, an exemplary embodiment of the liquid crystal lens, according to the invention, has a phase value ($ph_L$) at a central portion thereof less than a phase value of a conventional liquid crystal lens, and the central portion of the liquid crystal lens has a flat phase or a substantially constant phase.

In such an embodiment of the liquid crystal lens having a flat phase at the central portion thereof, the central lens electrode 311 of the first lens electrodes 301 may have a width wider than a width of the other first lens electrodes 301 on the lower substrate 100.

Referring to (B) of FIG. 4, when light is concentrated by a liquid crystal lens to display a three-dimensional ("3D") image while focusing a focal point of the liquid crystal lens 400 on a pixel of a display panel 500, a black matrix (not illustrated) disposed between adjacent pixels of the pixels in the display panel 500, e.g., first to ninth pixels 1 to 9, may be viewed with magnification at a certain angle by a viewer.

As illustrated in (C) of FIG. 4, the liquid crystal lens 400 may be disposed to defocus the focal point of the liquid crystal lens 400 to a certain extent without focusing the focal point of the liquid crystal lens 400 on one of the pixels 1 to 9 to effectively prevent the black matrix therebetween from being viewed with magnification at a certain angle, and the focal point of the liquid crystal lens is typically defocused by about 15%.

Referring to (A) of FIG. 4, in an exemplary embodiment of the liquid crystal lens 400 according to the invention, the liquid crystal lens 400 effectively prevents the black matrix therebetween from being viewed with magnification at a certain angle. In such an embodiment, instead of defocusing the focal point of the liquid crystal lens 400, the liquid crystal lens 400 is configured to have a flat phase at the central portion thereof by forming the central lens electrode 311 disposed at the central portion of the liquid crystal lens 400 to have a width wider than a width of the other electrodes. Accordingly, in such an embodiment, the same effect as the liquid crystal lens 400 illustrated in (C) of FIG. 4 is obtained.

In an exemplary embodiment, the central lens electrode 311 may have a width wider than the width of the central lens electrode of a liquid crystal display lens where the focal point is focused on one of the pixels 1 to 9 corresponding to the central lens electrode. In such an embodiment, when the phase at the central portion of the liquid crystal lens 400 is excessively wide by the central lens electrode 311 having an excessively wide width, the excessively wide phase of the liquid crystal lens may affect other pixels 1 to 9 disposed at both sides of the focused one of the pixels 1 to 9, on which the focal point of the liquid crystal lens 400 is disposed, such that a crosstalk may occur.

In an exemplary embodiment, the width of the central lens electrode 311 is in the predetermined range such that a crosstalk may be effectively prevented from occurring. In an exemplary embodiment, the width of the central lens electrode 311 may be determined based on a correlation of Formula 1 representing a relation between a cross-sectional pitch (p) of a sub-pixel of a 3D image, the number (n) of the unit liquid crystal lenses 400 constituting a unit pixel of the 3D image, and a slope (A) between the liquid crystal lens 400 and the display panel 500 on the display panel 500.

$$p/n \leq L * \cos\theta \leq p \qquad \text{Formula 1:}$$

In an exemplary embodiment, a width (L) of the central lens electrode 311 may be about 30 μm or more, based on the correlation of Formula 1.

Next, the spacer 180 disposed on the central lens electrode 311 in the exemplary embodiment of the invention will be described in detail with reference to FIG. 5.

Figure 5:
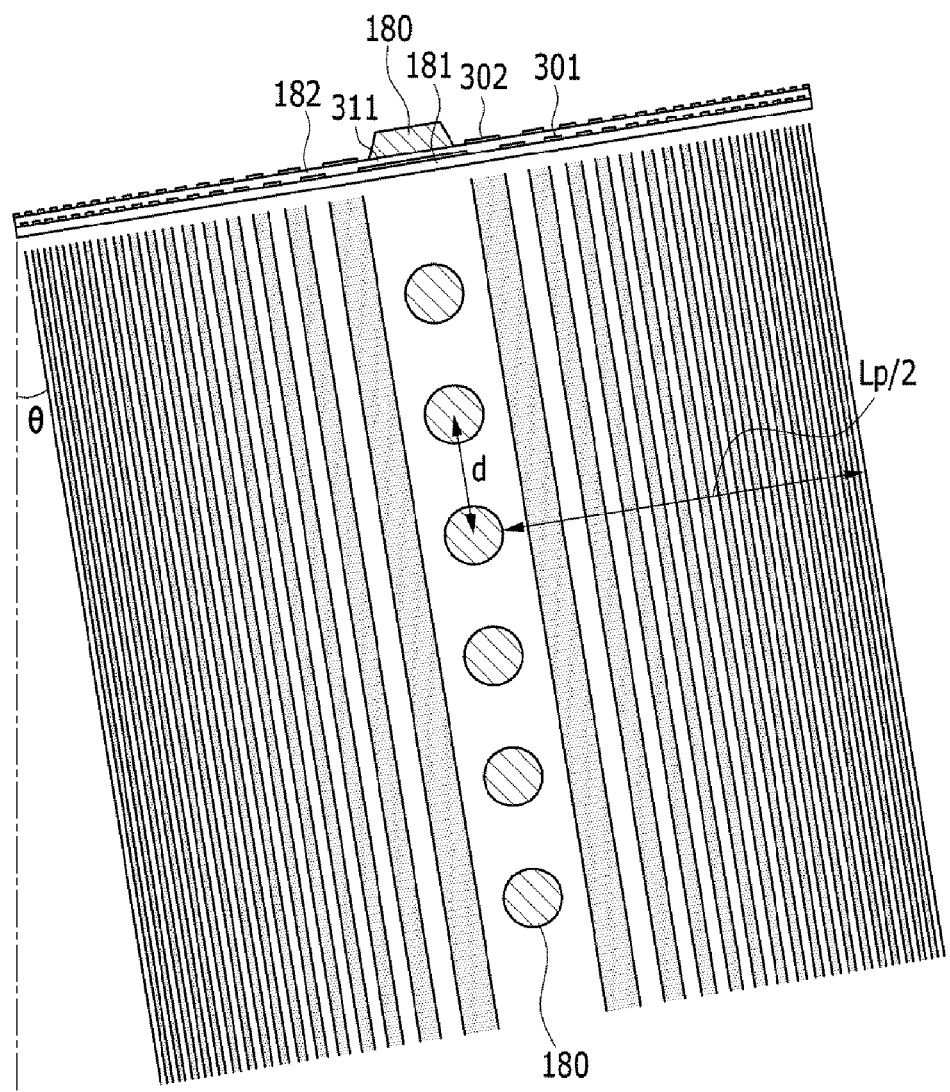
FIG. 5 is a diagram illustrating a cross-sectional view and an arrangement diagram of the lower lens electrode of an exemplary embodiment of the liquid crystal lens according to the invention.

FIG. 5 is a diagram illustrating a cross-sectional view and a plan view of an arrangement of the lower lens electrode of an exemplary embodiment of the liquid crystal lens according to the invention.

In the lower lens electrode 300, a plurality of branch electrodes (e.g., the first lens electrodes 301 and the second lens electrodes 302) is disposed in a stripe shape. The branch electrodes are repeatedly disposed in a predetermined pattern, and the repeating pattern of the branch electrodes constitutes or collectively defines a unit lens electrode. FIG. 5 illustrates one unit lens electrode.

In an exemplary embodiment, the unit lens electrode includes the first insulating layer 181, the first lens electrodes 301, the second insulating layer 182, the second lens electrodes 302 and the spacer 180.

The first lens electrodes 301 are disposed on the first insulating layer 181, the second insulating layer 182 is disposed on the first insulating layer 181, covering the first lens electrodes 301 disposed on the first insulating layer 181, and the second lens electrodes 302 are disposed on the second insulating layer 182. Accordingly, the first lens electrodes 301 and the second lens electrodes 302 are disposed in different layers form each other, and are electrically insulated from each other.

In an alternative exemplary embodiment, as described above, the second lens electrodes 302 and the second insulating layer 182 may be omitted.

In such an embodiment, in which the second lens electrodes 302 and the second insulating layer 182 are not provided in the lower lens electrode 300, the lower lens electrode 300 may have a single layer structure.

The unit lens has a shape in which a width of the lens electrode increases as it is closer to the central portion thereof. Such a unit lens functions as a zone plate type liquid crystal lens. The zone plate is also referred to as a Fresnel zone plate, and may exhibit a lensing effect by using diffraction of light. In an exemplary embodiment, different voltages are applied to the plurality of branch electrodes and the orientation degree of the liquid crystal molecules are thereby variously determined, such that the liquid crystal lens of the invention functions as the Fresnel lens.

In an exemplary embodiment, the spacer 180 may be disposed only on the central lens electrode 311. In such an embodiment, if the spacer 180 is a ball spacer, which is randomly dispersed on the substrate of the liquid crystal lens 400 without being disposed at a predetermined position, the ball spacer may flow on the substrate of the liquid crystal lens 400 to thereby cause a phase error. Accordingly, in an exemplary embodiment, the spacer 180 may be a column spacer as a fixed spacer configured to be fixed to a predetermined position.

In an exemplary embodiment, a top surface and a bottom surface of the spacer 180 may have a flat shape similar to the phase at the central portion of the liquid crystal lens 400, and may have various shapes such as a quadrangle shape, a trapezoid shape, a triangle shape and a circular shape, for example.

In such an embodiment, the spacer 180 may include a main spacer that supports the upper substrate and the lower substrate, and a sub spacer that allows the upper substrate and the lower substrate of the liquid crystal lens 400 to be flexible, that is to be bent or deformed to a certain degree.

In such an embodiment, the liquid crystal lens 400 has a flat phase at the portion of the liquid crystal lens 400 where the central lens electrode 311 is positioned, such that a phase error caused by the spacer 180 may be effectively prevented when the spacer 180 is disposed at the central portion of the liquid crystal lens 400 where the central lens electrode 311 is positioned.

In an exemplary embodiment, area ratio of the spacer 180 with respect to the unit liquid crystal lens is in a predetermined range, such that a phase error is effectively prevented from occurring, while maintaining a cell gap at a predetermined distance, and a smear margin may be ensured. In an exemplary embodiment, an area ratio M where the spacer 180 occupies in the unit liquid crystal lens 400, that is a ratio M of an area of the spacer 180 to an area of the unit liquid crystal lens 400, may be within a range of about 0.1 to about 0.2 (e.g., 0.1<M<0.2). In such an embodiment, the area ratio where the spacer 180 occupies the unit liquid crystal lens 400 may be calculated from N*$A_M$/A, where $A_m$ denotes an area where each spacer 180 occupies, N denotes the number of the spacers 180 in the unit liquid crystal lens 400, and A denotes the total area of the unit liquid crystal lens 400.

In such an embodiment, cell gaps at which prisms exhibit optimum performance may be determined based on a prism distribution of the liquid crystal lens 400. In general, a cell gap in which a prism positioned at the central portion of the liquid crystal lens 400 exhibits optimum performance is greater than cell gaps of prisms in low-level regions positioned at edge portions of the liquid crystal lens 400.

Accordingly, in an exemplary embodiment, a line d connecting the spacers 180 arranged at the unit liquid crystal lens 400 and the shortest distance Lp between central lens electrodes 311 of adjacent unit liquid crystal lenses 400 may be perpendicular to each other such that a cell gap of a cross section of the unit liquid crystal lens 400 is the highest at the central portion of the liquid crystal lens 400 and the cell gap is relatively low at the edge portions of the unit liquid crystal lens 400.

In an exemplary embodiment, the spacer 180 may be configured based on a correlation of Formula 2 representing a relation between a diameter R of the spacer 180, a distance d between two spacers 80 of the unit liquid crystal lens 400, a maximum area $A_m$ of one spacer, an area ratio M of the spacer 180 occupying in the unit liquid crystal lens 400, and the shortest distance Lp between central lens electrodes 311 of adjacent unit liquid crystal lenses 400 based on conditions of the liquid crystal lens 400 for exhibiting optimum performance.

$$R < |d| \leq A_M/M*Lp \qquad \text{Formula 2:}$$

In order to examine performance of an exemplary embodiment of the liquid crystal lens 400, in which the central lens electrode 311 has a width wider than a width of the other lower lens electrodes 300, and the spacer 180 is disposed only on the central lens electrode 311, a cell gap of the liquid crystal lens 400 is measured. The measurement result is shown in FIG. 6.

Figure 6:
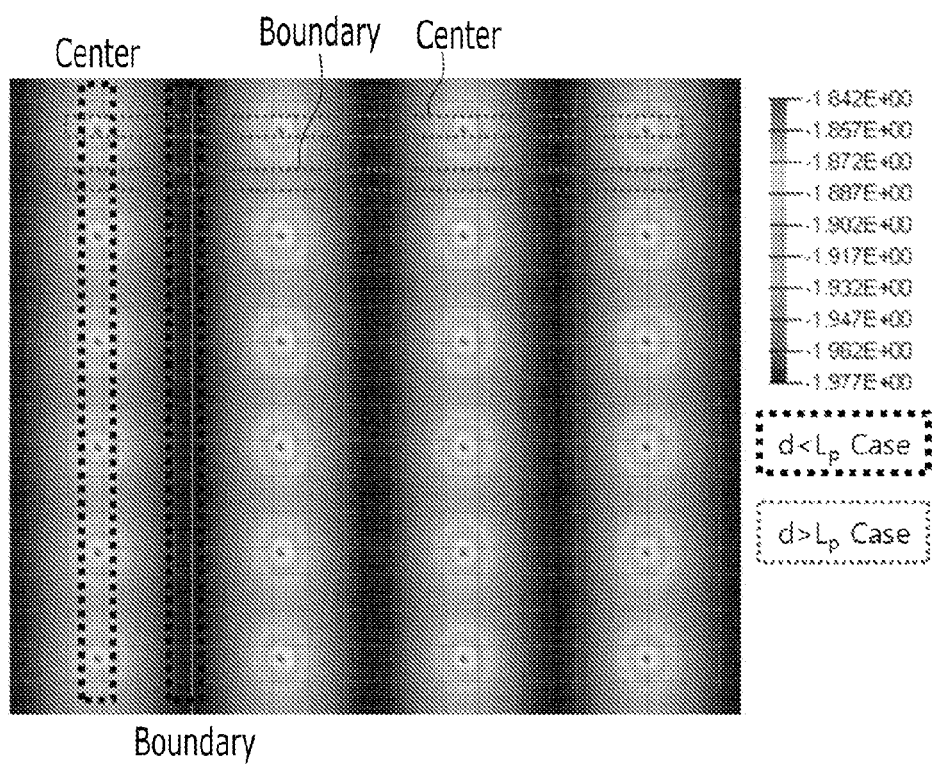
FIG. 6 is a diagram illustrating a result of measuring a cell gap of an exemplary embodiment of a liquid crystal lens panel according to the invention.

FIG. 6 is a diagram illustrating a result of measuring a cell gap of an exemplary embodiment of a liquid crystal lens panel according to the invention.

In FIG. 6, a portion represented by bright points corresponds to the central portion of the liquid crystal lens 400 where the spacer 180 is disposed, and portions between the bright points correspond to the edge portions of the liquid crystal lens 400.

As shown in FIG. 6, in an exemplary embodiment of the liquid crystal lens 400 according to the invention, the space is disposed on only the central lens electrode 311 at the central portion of the liquid crystal lens, so that the cell gap at the central portion of the liquid crystal lens 400 is higher than the cell gaps of the edge portions of the liquid crystal lens 400.

In such an embodiment, as described above, the cell gaps in which the prisms exhibit optimum performance are determined based on the prism distribution of the liquid crystal lens 400, and the cell gap in which the prism positioned at the central portion of the liquid crystal lens 400 exhibits optimum performance is greater than the cell gaps of the prisms 400 in low-level regions positioned at the edge portions of the liquid crystal lens. Accordingly, in an exemplary embodiment of the liquid crystal lens 400 according to the invention, as shown in FIG. 6, the cell gap is closer to an optimum cell gap for each prism of the liquid crystal lens 400 by the spacer 180 disposed only on the central portion of the liquid crystal lens 400.

In such an embodiment, when a difference in the cell gap between the central portion of the liquid crystal lens 400 and the edge portions of the liquid crystal lens 400 is about 0.2 µm or more. In an exemplary embodiment, the difference in the cell gap between the central portion of the liquid crystal lens 400 and the edge portions of the liquid crystal lens 400 is in a range of about 0.1 µm to about 0.2 µm such that a difference may be effectively prevented from being seen as a smear when a two-dimensional ("2D") image is viewed (e.g., when the liquid crystal lens is turned off).

In order to examine performance of an exemplary embodiment of the liquid crystal lens 400, in which the central lens electrode 311 has a width wider than the width of the other lower lens electrodes 300 and the spacer 180 is disposed only on the central lens electrode 311, a diffraction efficiency of the liquid crystal lens 400 is measured. Diffraction efficiencies of Comparative Examples are measured while varying the arrangement of the spacer 180, and the measurement results are shown in FIGS. 7A to 7C.

Figure 7A:
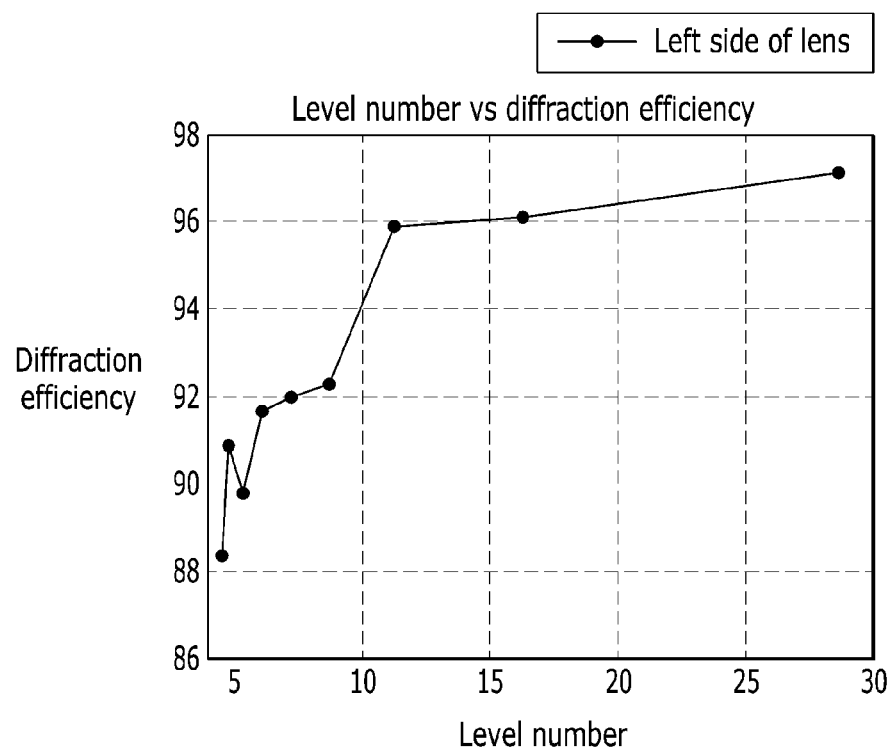
FIGS. 7A and 7B are graphs illustrating a result of measuring diffraction efficiencies of liquid crystal lenses according to Comparative Examples.
Figure 7B:
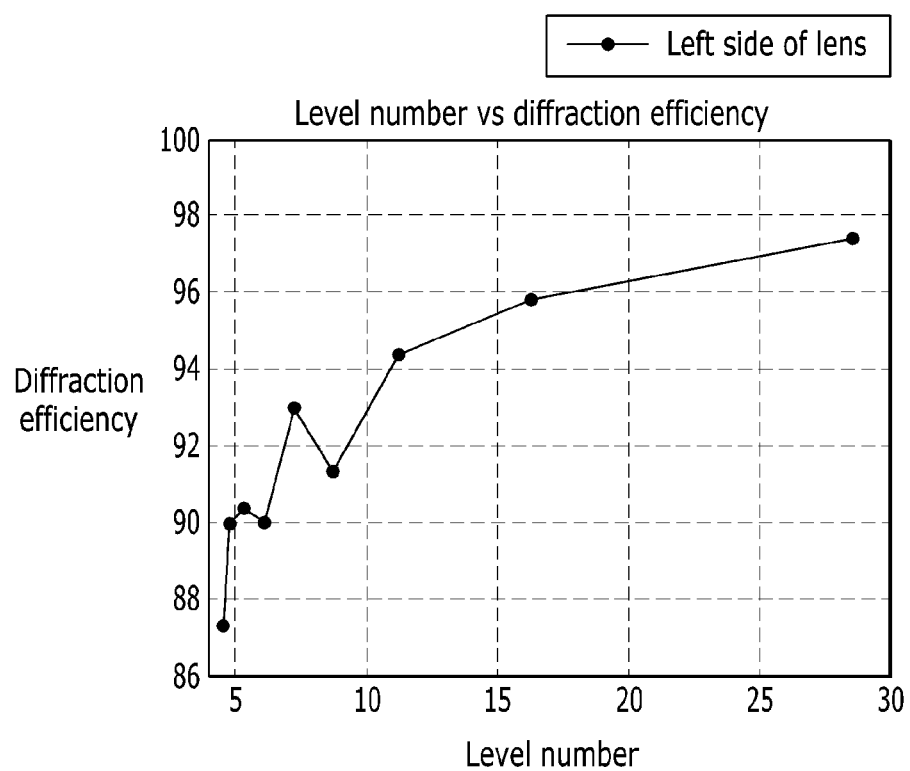
Figure 7C:
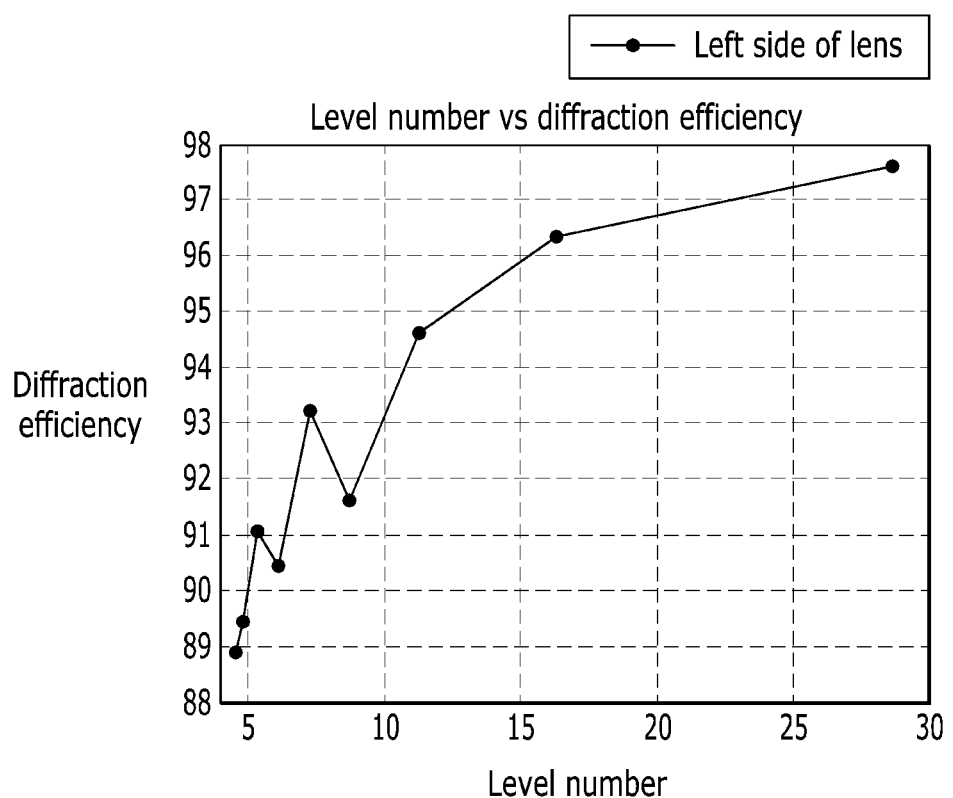
FIG. 7C is a graph illustrating a result of measuring a diffraction efficiency of an exemplary embodiment of the liquid crystal lens according to the invention.

In the graphs of FIGS. 7A to 7C, a horizontal axis depicts the number of lower lens electrodes 300 constituting one prism of the liquid crystal lens 400, and a vertical axis depicts a diffraction efficiency (%).

FIG. 7A illustrates a diffraction efficiency when the main spacer and the sub spacer are disposed at any position within the liquid crystal lens 400, FIG. 7B illustrates a diffraction efficiency when the main spacer is disposed on the central lens electrode 311 and the sub spacer is disposed at any position within the liquid crystal lens 400, and FIG. 7C illustrates a diffraction efficiency when both of the main spacer and the sub spacer are disposed at the central lens electrode 311 of the liquid crystal lens 400.

As shown in FIG. 7C, the diffraction efficiency of an exemplary embodiment of the liquid crystal lens 400 is improved by about 2% compared with the diffraction efficiencies of the liquid crystal lens 400 in which the spacer 180 is disposed at any position, which are measured as Comparative Examples illustrated in FIGS. 7A and 7B.

In such an embodiment, as shown in FIGS. 7A to 7C, the diffraction efficiencies in the low-level regions at the edge portions of the liquid crystal lens 400 rather than the diffraction efficiency at the central portion of the liquid crystal lens 400 is substantially improved.

Next, an exemplary embodiment of a method for driving an image display device including the display panel 500 that displays an image and the liquid crystal lens 400, according to the invention, will be described in detail with reference to FIGS. 8, 9 and 10.

First, an exemplary embodiment of a method for forming a 2D image and a 3D image by the display device will be described in detail with reference to FIGS. 8 and 9.

Figure 8:
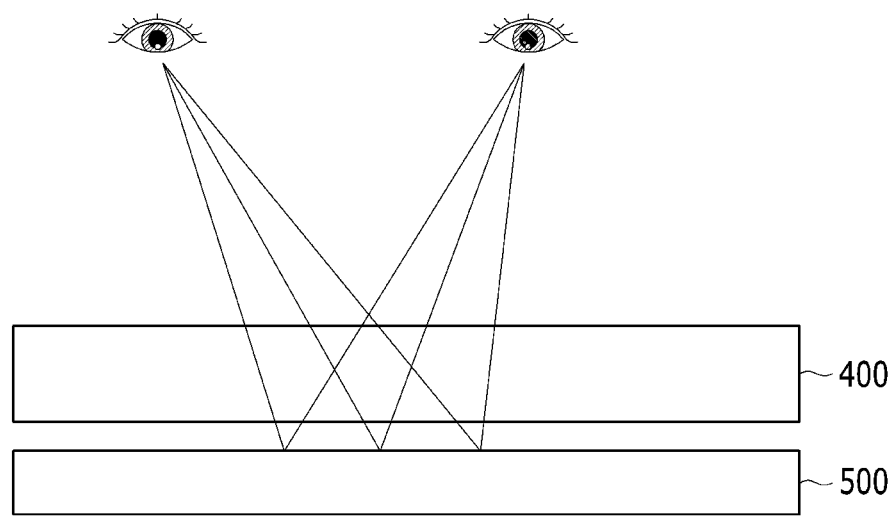
FIG. 8 is a block diagram for describing an exemplary embodiment of a method for driving a display device according to the invention.
Figure 9:
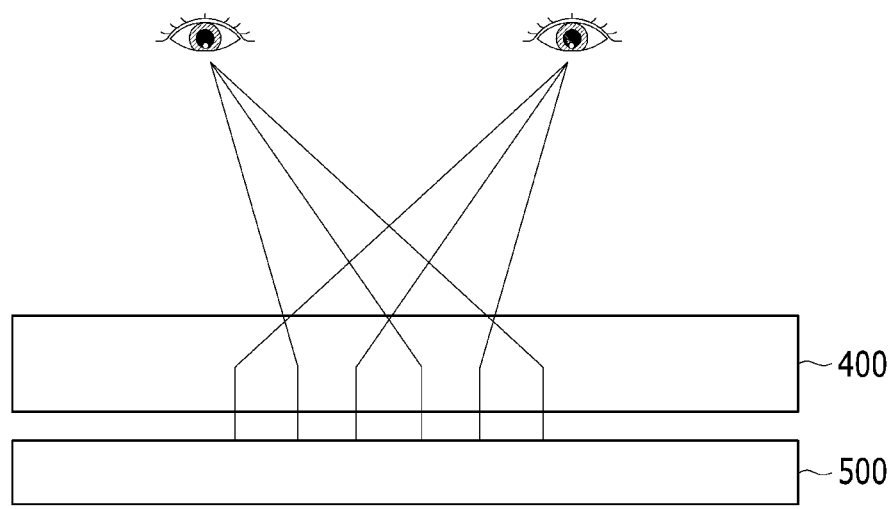
FIGS. 9 and 10 are diagrams for describing an exemplary embodiment of a method for forming a two-dimensional image and a three-dimensional image and a schematic structure of an exemplary embodiment of the display device according to the invention.

FIGS. 8 and 9 are diagrams for describing a schematic structure of an exemplary embodiment of the display device and an exemplary embodiment of a method for displaying a 2D image and a 3D image.

Referring to FIGS. 8 and 9, an exemplary embodiment of the display device includes the display panel 500 that displays an image, and the liquid crystal lens 400 that is disposed on a front surface of the display panel 500 where the image is displayed.

The display panel 500 may be one of various types of flat panel display devices such as a plasma display device ("PDP"), a liquid crystal display device, and an organic light-emitting display device, for example. The display panel 500 includes a plurality of pixels that displays an image and is disposed substantially in a matrix form. The display panel 500 may display one plane image in a 2D mode, and alternately display images corresponding to various fields of vision such as a right eye image and a left eye image in a 3D mode in a space or time division scheme. In one exemplary embodiment, for example, in the 3D mode, the display panel 500 may alternately display the right eyes image and the left eye image through pixels in each column.

The liquid crystal lens 400 is configured to divide the fields of vision of the image displayed on the display panel 500 using diffraction of light, and the operation thereof may be switched on or off. In an exemplary embodiment, the liquid crystal lens 400 diffracts the image on the display panel 500 using the diffraction of light to form an image in the corresponding field of vision. In such an embodiment, the liquid crystal lens 400 is turned off when the display panel 500 is in the 2D mode, and is turned on when the display panel is in the 3D mode to divide the fields of vision of the image on the display panel 500. In an alternative exemplary embodiment, the liquid crystal lens 400 may be turned off when the display panel 500 is in the 3D mode, and may be turned on when the display panel 500 is in the 2D mode.

FIG. 8 illustrates a case where the 2D image is seen by allowing the same image to reach the left eye and the right eye when the liquid crystal lens 400 is turned off, and FIG. 9 illustrates a case where the 3D image is seen by dividing the image of the display panel 500 into the fields of vision such as the left eye image and the right eye image and diffracting the images when the liquid crystal lens 400 is turned on.

The liquid crystal lens 400 may be implemented as a Fresnel zone plate. In general, the Fresnel zone plate is radially disposed such as a Fresnel zone, and is a device serving as a lens by using a plurality of concentric circular shape or concentric ring shapes, in which a distance between the rings is narrowed as the it is closer to outside from the center thereof, and by using the diffraction of light instead of the refraction of light.

Figure 10:
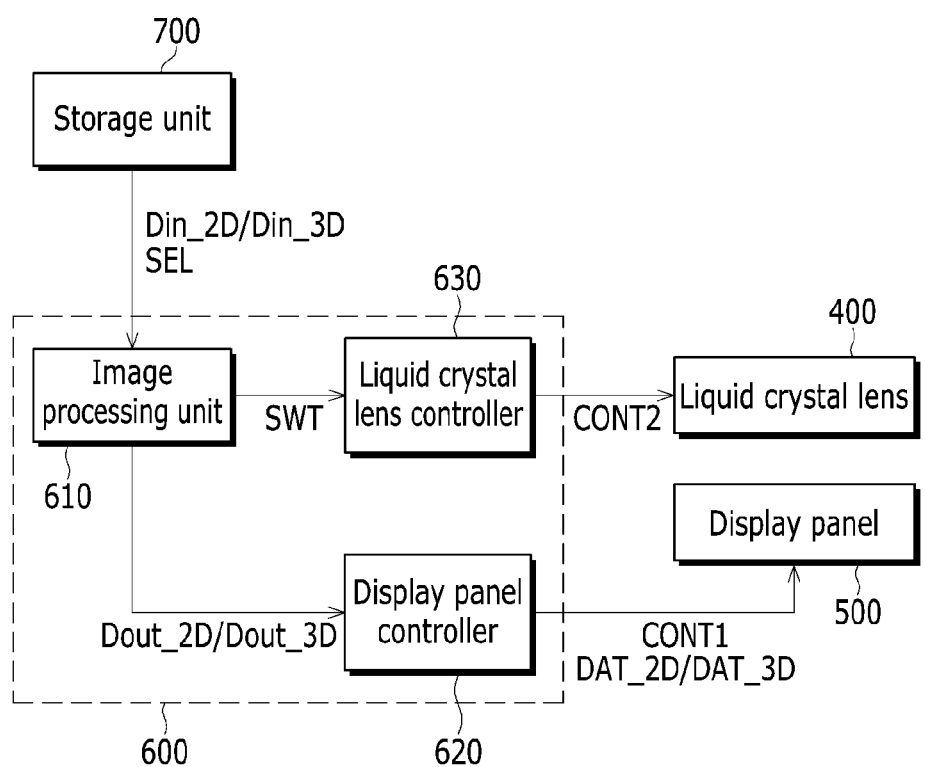

FIG. 10 is a block diagram illustrating an exemplary embodiment of a method for driving the image display device according to the invention.

An external storage unit 700 of the image display device may store 2D image information and 3D image information, and receive, from the outside, selection information for determining which one of the 2D image and the 3D image is displayed. When receiving the selection information, the storage unit 700 sends a 2D image signal Din_2D or a 3D image signal Din_3D and a selection signal SEL to a controller 600 of the image display device based on the selection information. In an alternative exemplary embodiment, the type of the image signal sent by the storage unit 700 may be determined by the controller 600, and the selection signal SEL may be omitted.

An image processing unit 610 of the controller 600 receives the 2D image signal Din_2D or 3D image signal Din_3D and the selection signal SEL, and processes the signals based on an operational condition of the image display device. Thereafter, the image processing unit sends a processed 2D image signal Dout_2D or 3D image signal Dout_3D to a display panel controller 620 and sends a switching signal SWT to a liquid crystal lens controller 630. The switching signal SWT is a signal for switching on or off the liquid crystal lens 400.

In response to the switching signal SWT, the liquid crystal lens controller 630 generates a liquid crystal lens control signal CONT2, and sends the generated liquid crystal lens control signal CONT2 to the liquid crystal lens 400 of the image display device. The liquid crystal lens control signal CONT2 is used to control the liquid crystal lens 400 to be switched on or off.

In response to the processed 2D image signal Dout_2D or the processed 3D image signal Dout_3D, the display panel controller 620 generates a display panel control signal CONT1 and 2D image data DAT_2D or 3D image data DAT_3D, and sends the generated signal and data to the display panel 500. The display panel control signal CONT1 is used to control the display panel 500 to be operated in the 3D mode or the 2D mode.

The display panel 500 is operated in the 2D mode or the 3D mode based on the display panel control signal CONT1. In the 2D mode, the display panel displays the 2D image data DAT_2D, and in the 3D mode, the display panel displays the 3D image data DAT_3D.

The liquid crystal lens 400 is switched on or off depending on the liquid crystal lens control signal CONT2. In an exemplary embodiment, the liquid crystal lens 400 may be switched off when the display panel 500 is in the 2D mode, and may be switched on when the display panel 500 is in the 3D mode. In an alternative exemplary embodiment, the liquid crystal lens 400 may be switched off when the display panel 500 is in the 3D mode, and may be switched on when the display panel 500 is in the 2D mode. The above-stated switching mode of the liquid crystal lens may be determined based on the type of the liquid crystal lens 400.

As described above, in an exemplary embodiment of the liquid crystal lens according to the invention, the width of the central electrode disposed under the liquid crystal lens is configured to have a predetermined value to allow the liquid crystal lens to have a flat phase at the central portion thereof, and the column spacer is disposed only on the central electrode of the liquid crystal lens, such that an error such as texture occurring on the surface of the liquid crystal lens may be effectively prevented, and the diffraction efficiency is substantially improved.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal lens comprising:
a lower substrate;
an upper substrate disposed opposite to the lower substrate;
a plurality of lower lens electrodes disposed on the lower substrate and corresponding to a unit liquid crystal lens;
an upper lens electrode disposed on substantially an entire surface of the upper substrate;
a spacer disposed between the lower substrate and the upper substrate; and
a liquid crystal layer disposed between the lower substrate and the upper substrate,
wherein
the lower lens electrodes comprise a flat-shaped central lens electrode disposed at a central portion thereof and having a width greater than a width of other lower lens electrodes corresponding to the unit liquid crystal lens,
the lower lens electrodes comprise a plurality of branch electrodes disposed at a left side of the central lens electrode, a width each of the plurality of branch electrodes is increased as it is closer to the central lens electrode corresponding to the unit liquid crystal lens, and
the spacer is disposed only on the central lens electrode.

2. The liquid crystal lens of claim 1, further comprising:
a first insulating layer disposed on the lower substrate;
a first lens electrode layer disposed on the first insulating layer;
a second insulating layer disposed on the first lens electrode layer; and
a second lens electrode layer disposed on the second insulating layer,
wherein the lower lens electrodes are disposed in the first and second lens electrode layers.

3. The liquid crystal lens of claim 2, wherein
the central lens electrode is disposed in the first lens electrode layer or the second lens electrode layer.

4. The liquid crystal lens of claim 1, wherein
a phase of the liquid crystal lens is flat at the central portion thereof where the central lens electrode is disposed.

5. The liquid crystal lens of claim 4, wherein
a value of the phase at the central portion of the liquid crystal lens is less than values of phases at portions of the liquid crystal lens other than the central portion.

6. The liquid crystal lens of claim 5, wherein
a width of the central lens electrode satisfies the following formula:

$$p/n \leq L*\cos\theta \leq p,$$

wherein
p denotes a cross-sectional pitch of a sub pixel of a three-dimensional image to be displayed through the liquid crystal lens,
n denotes the number of unit liquid crystal lenses constituting a unit pixel of the three-dimensional image,
L denotes the width of the central lens electrode, and
θ denotes a slope between the liquid crystal lens and a display panel which display the three dimensional image.

7. The liquid crystal lens of claim 1, wherein
the spacer is a fixed spacer, and
a plurality of spacers is disposed along a line in which the central lens electrode extends.

8. The liquid crystal lens of claim 7, wherein
each of the spacers is a column spacer.

9. The liquid crystal lens of claim 8, wherein
a top surface and a bottom surface of each of the spacers have a flat circular shape.

10. The liquid crystal lens of claim 8, wherein
the spacers comprise:
a main spacer which supports the upper substrate and the lower substrate; and a sub spacer which allows the upper substrate and the lower substrate to be flexible.

11. The liquid crystal lens of claim 7, wherein an area ratio of the spacers in the unit liquid crystal lens is in a range of about 0.1 to about 0.2.

12. The liquid crystal lens of claim 11, wherein a distance between the spacers satisfies the following formula:

$$R<|d|\leq AM/M*Lp,$$

wherein

R denotes a diameter of each of the spacers, d denotes a distance between two adjacent spacers, AM denotes a maximum area of each of the spacers, M denotes the area ratio of the spacers in the unit liquid crystal lens, and Lp denotes the shortest distance between central lens electrodes of adjacent unit liquid crystal lenses.

13. The liquid crystal lens of claim 7, wherein a cell gap at the central portion of the liquid crystal lens is greater than cell gaps at edge portions of the liquid crystal lens.

14. The liquid crystal lens of claim 1, wherein the spacer is a single unitary part having a width less than the width of the central lens electrode and substantially extending an entirety of the width of the central lens electrode.

15. A display device comprising:

a display panel which displays an image; and a liquid crystal lens configured to allow the image on the display panel to be seen as a two-dimensional image or a three-dimensional image, wherein the liquid crystal lens comprises:

a lower substrate;

an upper substrate disposed opposite to the lower substrate, a plurality of lower lens electrodes disposed on the lower substrate and corresponding to a unit liquid crystal lens, an upper lens electrode disposed on substantially an entire surface of the upper substrate, a spacer disposed between the lower substrate and the upper substrate, the lower lens electrodes comprise a plurality of branch electrodes disposed at a left side of the central lens electrode, a width each of the plurality of branch electrodes is increased as it is closer to the central lens electrode corresponding to the unit liquid crystal lens, and a liquid crystal layer disposed between the lower substrate and the upper substrate, wherein the lower lens electrodes comprise a flat-shaped central lens electrode disposed at a central portion of the liquid crystal lens and having a width wider than a width of other lower lens electrodes corresponding to the unit liquid crystal lens, and the spacer is disposed only on the central lens electrode.

16. The display device of claim 15, wherein the lower lens electrodes have a single layer structure or a multi-layer structure.

17. The display device of claim 16, wherein a phase of the liquid crystal lens is flat at the central portion of the liquid crystal lens where the central lens electrode is disposed, a value of the phase at the central portion of the liquid crystal lens is less than values of phases at portions of the liquid crystal lens other than central portion.

18. The display device of claim 17, wherein a width of the central lens electrode satisfies the following formula:

$$p/n \leq L*\cos\theta \leq p,$$

wherein p denotes a cross-sectional pitch of a sub-pixel of the display panel, n denotes the number of unit liquid crystal lenses constituting a unit pixel of a three-dimensional image, L denotes the width of the central lens electrode, and θ denotes a slope between the liquid crystal lens and the display panel.

19. The display device of claim 17, wherein an area ratio of the spacer in the unit liquid crystal lens is in a range of about 0.1 to about 0.2.

20. The display device of claim 19, wherein the liquid crystal lens comprises a plurality of spacer, and a distance between the spacers satisfies the following formula:

$$R<|d|\leq AM/M*Lp,$$

wherein

R denotes a diameter of each of the spacers, d denotes a distance between two adjacent spacers, AM denotes a maximum area of each of the spacers, M denotes an area ratio of the spacers in the liquid crystal lens, and Lp denotes the shortest distance between central lens electrodes adjacent unit liquid crystal lenses of the liquid crystal lens.

* * * * *